(12) United States Patent
Bhattacharya (10) Patent No.: US 8,006,201 B2
(45) Date of Patent: Aug. 23, 2011

(54) METHOD AND SYSTEM FOR GENERATING THUMBNAILS FOR VIDEO FILES

(75) Inventor: Shubham Baidyanath Bhattacharya, Maharashtra (IN)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 396 days.

(21) Appl. No.: 12/203,247

(22) Filed: Sep. 3, 2008

(65) Prior Publication Data

US 2009/0064048 A1    Mar. 5, 2009

(51) Int. Cl.
*G06F 3/048* (2006.01)

(52) U.S. Cl. ........ 715/838; 715/716; 715/719; 715/722; 715/825

(58) Field of Classification Search .................. 715/838, 715/825, 716, 719, 722
See application file for complete search history.

(56) References Cited

U.S. PATENT DOCUMENTS

| | | | | |
|---|---|---|---|---|
| 5,864,681 A * | 1/1999 | Proctor et al. | ................. | 709/247 |
| 6,912,327 B1 * | 6/2005 | Hori et al. | ...................... | 382/305 |
| 7,152,209 B2 * | 12/2006 | Jojic et al. | ...................... | 715/720 |
| 7,194,701 B2 * | 3/2007 | Stavely et al. | ................. | 715/838 |
| 7,386,218 B2 * | 6/2008 | Temple et al. | ................. | 386/241 |
| 7,761,322 B2 * | 7/2010 | Nakamura et al. | ................. | 705/8 |
| 2002/0133486 A1 * | 9/2002 | Yanagihara et al. | ............... | 707/3 |
| 2002/0197060 A1 * | 12/2002 | Itoh et al. | ......................... | 386/69 |
| 2003/0038830 A1 | 2/2003 | Bean et al. | | |
| 2003/0156824 A1 | 8/2003 | Lu | | |
| 2003/0206716 A1 | 11/2003 | Posa et al. | | |
| 2006/0026524 A1 * | 2/2006 | Ma et al. | ......................... | 715/713 |
| 2007/0126889 A1 * | 6/2007 | Kim | ............................. | 348/231.2 |
| 2008/0034325 A1 * | 2/2008 | Ording | ............................ | 715/838 |
| 2008/0086688 A1 * | 4/2008 | Chandratillake et al. | ..... | 715/719 |
| 2008/0120328 A1 * | 5/2008 | Delgo et al. | ................... | 707/102 |

FOREIGN PATENT DOCUMENTS

WO    WO 2007/133668    11/2007

* cited by examiner

*Primary Examiner* — Tadeese Hailu
(74) *Attorney, Agent, or Firm* — Cha & Reiter, LLC (57) ABSTRACT

A method for generating thumbnails for video files includes receiving one or more parameters associated with a plurality of thumbnails to be displayed simultaneously and a plurality of frames for each thumbnail. The plurality of frames for each thumbnail is extracted from one or more video files. The frames for each thumbnail are stored in a corresponding buffer and/or can be displayed by retrieval from the buffer. The plurality of frames for each thumbnail can be displayed simultaneously. A device includes one or more decoders for decoding one or more video files, a processor for generating a plurality of thumbnails from the one or more video files by extracting a plurality of frames for each thumbnail using one or more parsers, and a storage unit in communication with the processor for storing the plurality of frames for each thumbnail.

12 Claims, 7 Drawing Sheets

METHOD AND SYSTEM FOR GENERATING THUMBNAILS FOR VIDEO FILES

CLAIM OF PRIORITY

This application claims priority from Indian application serial number 1973/CHE/2007 filed Sep. 3, 2007, the contents of which are incorporated by reference in its entirety.

BACKGROUND OF THE INVENTION

1. Field of the Invention

The present disclosure relates to the field of video files and more particularly to generation of thumbnails for the video files.

2. Description of the Related Art

In a list of files on any device, a filename can be displayed alongside pictorial representation of a video file. The pictorial representation can be a default icon showing a static image. The static image may include a key frame indicating content of the video file at a particular instance. However, the static image lacks the ability to distinguish between image files and video files. Further, the static image is not an appropriate representation of the content of the video file.

Moreover, with the static image, the user is unable to identify the content of the video file without playing the video file. Even when the video file is played, a user may desire to access different sections in the video file. One technique of accessing different sections in the video includes forwarding or "rewinding" the video. However, the user needs to remember the time of appearance of the sections in the video to access those sections. Remembering time of appearance of sections in video becomes challenging when duration of video is long. Further, the user is often unaware about the content in various sections of the video based on the static image.

In light of the foregoing discussion there is a need for an efficient technique for generating thumbnails for video files.

SUMMARY OF THE INVENTION

The present invention provides a method and system for generating thumbnail for video files.

An example of a method for generating thumbnails for video files according to the present invention includes receiving one or more parameters associated with number of thumbnails to be displayed simultaneously and number of frames for each thumbnail. The method may include extracting a plurality of frames for each thumbnail from one or more video files. Further, the method also includes storing the plurality of frames for each thumbnail in a corresponding buffer. The method may also include enabling display of the plurality of frames for each thumbnail. The method may also include retrieving the plurality of frames for each thumbnail from the corresponding buffer. Moreover, the method can include displaying the plurality of frames for each thumbnail simultaneously.

Another example of a method for generating thumbnails for a video file according to the present invention includes receiving one or more parameters associated with number of thumbnails to be displayed simultaneously, start time and end time for each thumbnail, and number of frames for each thumbnail. Each thumbnail is typically associated with a portion of the video file. The method may include extracting a plurality of frames for each thumbnail from the video file based on the start time for each thumbnail. The extracting of a plurality of frames for each thumbnail can be from one or more video files. Further, the storing of a plurality of frames for each thumbnail may be in a corresponding buffer. The method includes enabling display of the plurality of frames for each thumbnail. The retrieving of the plurality of frames for each thumbnail may also be from corresponding buffer. Moreover, the plurality of frames may be for each thumbnail simultaneously.

Another example of a method for generating thumbnails for video files according to the present invention includes receiving one or more parameters associated with number of thumbnails to be displayed simultaneously and number of frames for each thumbnail. The extracting of a plurality of frames for each thumbnail can be from one or more video files. Further, the storing of the plurality of frames for each thumbnail may occur in a corresponding buffer from where the plurality of frames for each thumbnail is accessed.

Another example of a device according to the present invention may include one or more decoders for decoding one or more video files. Further, the system may include a processor for generating a plurality of thumbnails from the one or more video files by extracting a plurality of frames for each thumbnail using one or more parsers. Moreover, the system can include a storage unit in communication with the processor for storing the plurality of frames for each thumbnail from where the plurality of frames for each thumbnail can be accessed.

BRIEF DESCRIPTION OF THE DRAWINGS

The accompanying figures include similar reference numerals that may refer to identical or functionally similar elements. These reference numerals are used in the detailed description to illustrate various examples and aspects of the present invention and to explain several advantages of the present invention.

Persons skilled in the art will appreciate that elements in the figures are illustrated for simplicity and clarity and may have not been drawn to scale. For example, the dimensions of some of the elements in the figures may be exaggerated relative to other elements to help to improve understanding of various embodiments of the present disclosure.

DETAILED DESCRIPTION

It should be observed that exemplary method steps and exemplary system components have been represented by conventional symbols in the figures, showing only specific details that are relevant for an understanding of the present disclosure. Further, details that may be readily apparent to person ordinarily skilled in the art may not have been disclosed so as not to obscure appreciation of the subject matter of the present invention by an artisan with known configurations and descriptions. In the present disclosure, relational terms such as first and second, and the like, may be used to distinguish one entity from another entity, without necessarily implying any actual relationship or order between such entities.

Exemplary embodiments of the present disclosure provide a method and system for generating thumbnails for video files.

Figure 1:
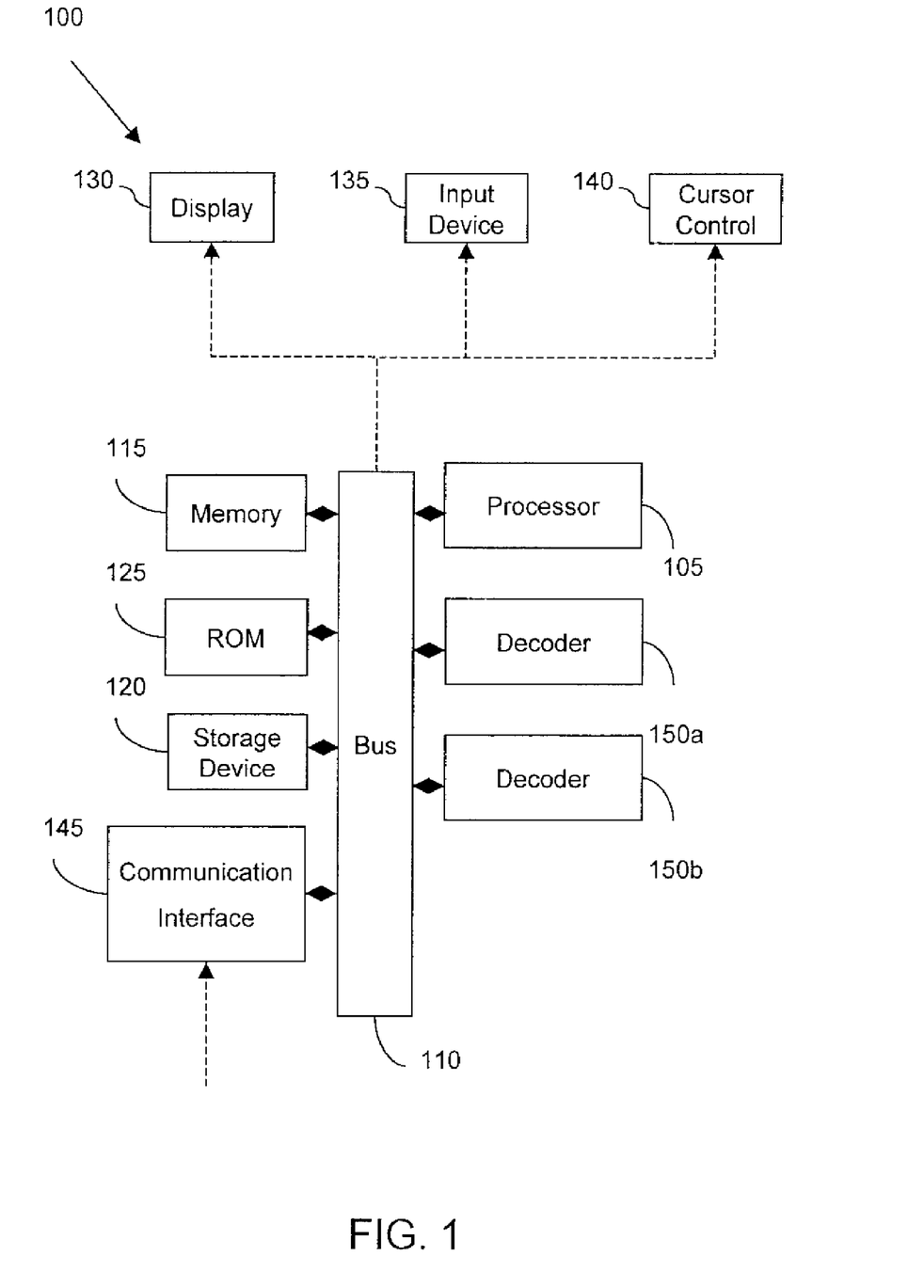
FIG. 1 is a block diagram of a device, in accordance with one exemplary embodiment.

FIG. 1 is a block diagram of a device 100, in accordance with one exemplary embodiment. Examples of the device 100 include, but are not limited to, a mobile device, a computer, a laptop, a hand held device and personal digital assistants (PDAs).

The device 100 includes a processor 105 coupled with a bus 110 for processing information. The device 100 can also include a memory 115, such as a random access memory (RAM) or other dynamic storage device 120, coupled to the bus 110 for storing information. The memory 115 can be used for storing temporary variables or other intermediate information during generation of thumbnails by the processor 105. The device 100 can also include a read only memory (ROM) 125 or other static storage device coupled to the bus 110 for storing static information. The storage device 120, such as a magnetic disk or optical disk, can also be provided and coupled to the bus 110, for storing information. The bus 110 can be coupled to a display 130, an input device 135, including alphanumeric and other keys, and another type of user input device, for example, a cursor control 140, such as a mouse, a trackball, or cursor direction keys. The device 100 can also include a communication interface 145 for communicating with a network.

Exemplary embodiments of the present invention are related to the device 100 implementing a plurality of the techniques described herein in some non-limiting examples. In one exemplary embodiment, the techniques are performed by the processor 105 by using information included in the memory 115. Such information can be read into the memory 115 from another machine-readable medium, such as the storage device 120.

Common forms of machine-readable medium can include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read, for example online software, download links, installation links, and online links.

The device 100 includes one or more decoders, for example, a decoder 150a and a decoder 150b for decoding one or more video files. Examples of the video files include, but are not limited to in any way, videos, sequences of images, and animated sequences. The video files can be accessed, for example, from the storage device 120. The processor 105 generates a plurality of thumbnails from the video files by extracting a plurality of frames for each thumbnail using one or more parsers. The parsers can be created by the processor 105. The parsers parse the video files before the files are decoded. If the thumbnails correspond to multiple video files then either one parser decoder combination can be used to process the entirety of multiple video files, or one parser decoder combination can be used per video file (or possible a number somewhere there between the aforementioned). If the thumbnails correspond to one video file, then only one parser decoder combination is preferably used for all the thumbnails.

Still referring to FIG. 1, the storage device 120 is in communication with the processor 105 for storing the plurality of frames for each thumbnail. The plurality of frames can be accessed from the storage device 120. In some exemplary embodiments, the plurality of frames for each thumbnail is displayed using the display 130. The input device 135 is in communication with the processor 105 for providing inputs for generating the plurality of thumbnails. The inputs can include, for example, parameters associated with the number of thumbnails to be displayed simultaneously, total number of video files and number of frames to be extracted for each thumbnail, if the thumbnails correspond to multiple video files. The inputs can include parameters associated with the number of thumbnails to be displayed simultaneously, the number of chapters to be generated for the video file, duration of each chapter, start time of each chapter, end time of each chapter, and number of frames to be extracted for each thumbnail or number of frames to be extracted per chapter, if the thumbnails correspond to a single video file.

Figure 2A:
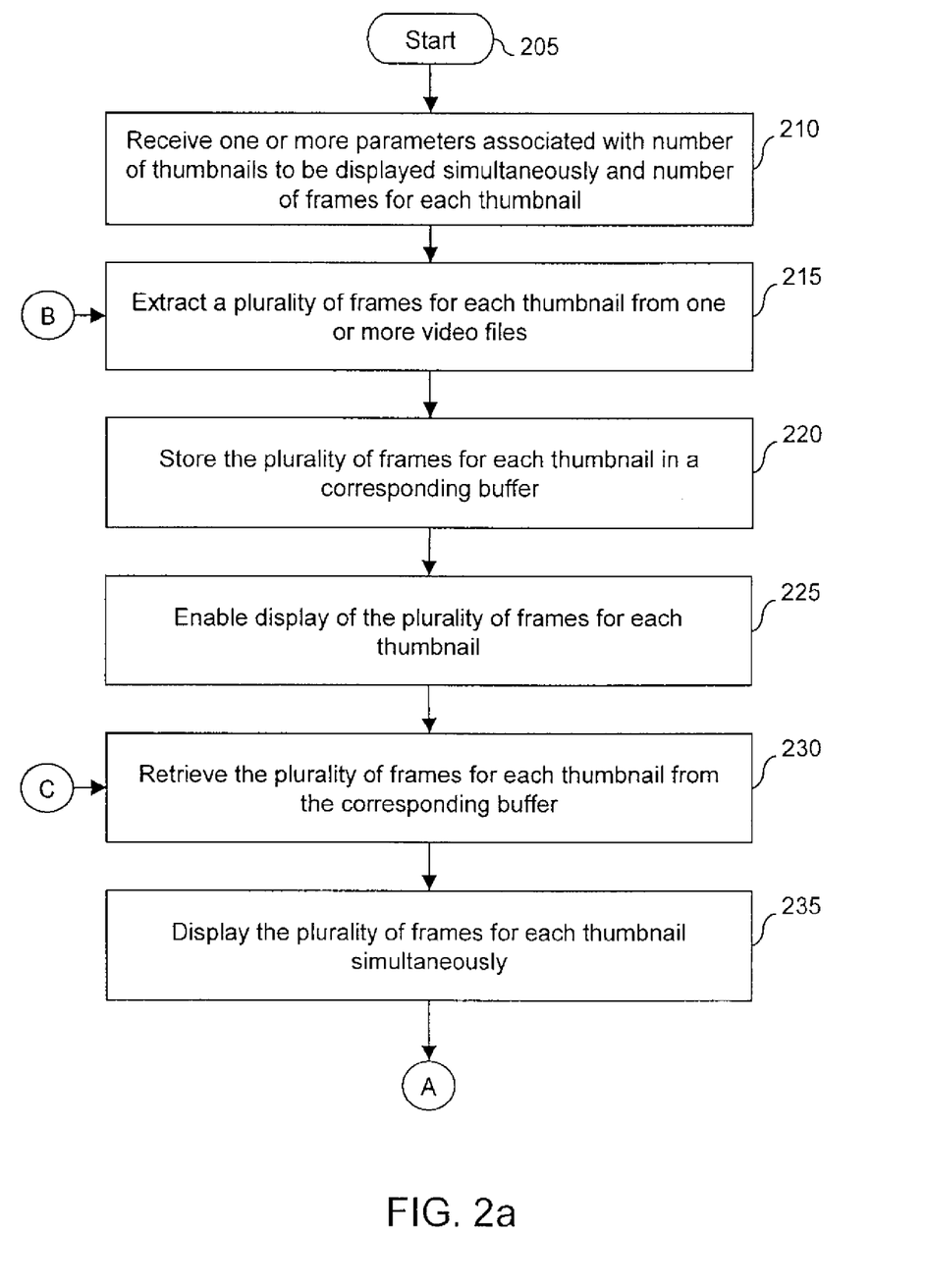
FIGS. 2a and 2b are a flowchart illustrating a method for generating thumbnails for video files, in accordance with one exemplary embodiment.
Figure 2B:
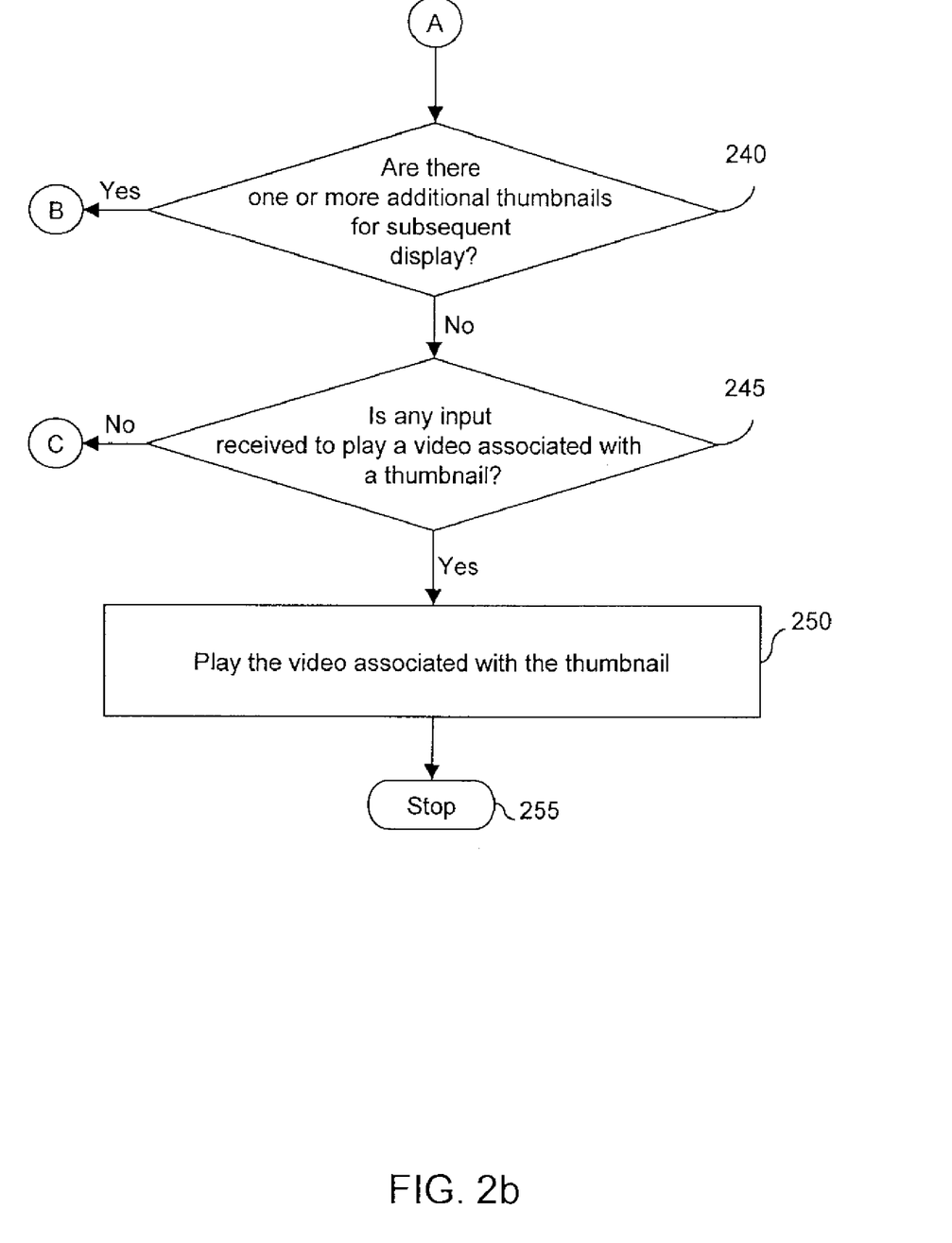

FIGS. 2a and 2b are a flowchart illustrating exemplary steps of a method for generating thumbnails for video files, in accordance with one exemplary embodiment of the present invention.

Referring now to FIG. 2a, the method starts at step 205. At step 210, one or more parameters associated with the number of thumbnails to be displayed simultaneously on a screen of a device and the number of frames to be extracted for each thumbnail is received. A user of the device may initiates the generation of thumbnails for the video files or the generation of thumbnails for a single video file.

The thumbnails correspond to multiple video files and the parameter associated with the total number of thumbnails to be displayed is also received, if, for example the user happens to initiate the generation of thumbnails for multiple video files. In such cases, each thumbnail can be associated with one video file. The total number of thumbnails to be displayed can be equal, for example, less than the total number of video files present in a file system of the device. The file system, for example may be present in a storage device.

The thumbnails may correspond to different chapters of a single video file and the parameters associated with the total number of chapters to be generated for the video file, duration of each chapter, start time and end time of each chapter, and number of frames to be extracted per chapter are also received, if the user initiates the generation of thumbnails for a single video file. A chapter can be defined as a portion or a section of the video file. In such case each thumbnail is associated with one chapter of the video file. The total number of thumbnails to be displayed can be equal to or less than the total number of chapters of the video file. In some exemplary embodiments, the starting point and the ending point for each chapter can be received as a specific timestamp from the user. In another exemplary aspect of the invention, the number of chapters desired can be received and the starting point and the ending point of each chapter with respect to the total duration of the video file can be determined.

It will be appreciated by a person of ordinary skill in the art that various other methods of inputting the chapter the start point and the end point can be possible within the spirit of the present invention and the scope of the appended claims.

The parameter associated with the number of thumbnails to be displayed simultaneously on the screen can include, for example, the size of the thumbnails. Since, multiple chapters are to be presented to the user at the same time, the chapters can be rendered on different areas of the screen at a size resolution which can be same or different as compared to the original resolution of the video file. The desired thumbnail dimensions can be received through various means. In some embodiments, a common size for each thumbnail can be configured and the number of thumbnails can be determined using the common size of each thumbnail and the screen size. For each thumbnail only the location, for example X, Y co-ordinates of each thumbnail on the screen can be varied.

The parameter associated with the number of thumbnails to be displayed simultaneously or alternatively can include the number of chapters being rendered at one point of time, versus the total number of chapters that the video file is divided into. For example, the video file of a duration of 60 minutes long could be said to be divided into chapters of 10 minutes each, resulting in a count of 6 chapters being formed. The user can then decide to render only 3 chapters on the screen at one time, resulting in 2-screen-views of the chapters. The user could thus browse among 3 chapters within one screen, and then navigate to another screen to browse through 3 more chapters.

At step 215, a plurality of frames is extracted for each thumbnail from one or more video files. If the user initiates the generation of thumbnails for multiple video files, then each thumbnail corresponds to one video file and hence, the plurality of frames are extracted for each thumbnail from the corresponding video file. One or more parsers and one or more decoders can be used for extracting the plurality of frames for each thumbnail from the multiple video files. In some exemplary embodiments, a single parser decoder combination(s) can be used to extract the plurality of frames for each thumbnail from the multiple video files. The method for extracting the plurality of frames for each thumbnail from multiple video files is explained in detail in conjunction with FIG. 3.

Each thumbnail, in this particular example, corresponds to one chapter of one video file, if the user initiates the generation of thumbnails for a single video file and hence, the plurality of frames is extracted for each thumbnail from the corresponding chapter of the single video file. A single parser decoder combination is used to extract the plurality of frames for each thumbnail from the single video file. The method for extracting the plurality of frames for each thumbnail form a single video file is explained in detail in conjunction with FIG. 4.

At step 220, the plurality of frames for each thumbnail is stored in a corresponding buffer. A buffer can be allocated corresponding to each thumbnail. The size of each buffer can be governed, for example, by color space. For example, RGB 565 color space which is 2 bytes per pixel or YCbCr 420 color space which is 1.5 bytes per pixel. Each buffer can be divided further into various sections. Each section of the buffer corresponds to a frame. The number of sections in the buffer is equal to the number of frames to be extracted.

In some exemplary embodiments, the method may end at step 220. The plurality of frames for each thumbnail stored in the buffers can be accessed later for the purpose of display or providing to any other device.

At step 225, the display of the plurality of frames for each thumbnail is enabled. The enabling includes indicating to an application platform to start retrieving the plurality of frames for each thumbnail. The enabling includes initializing the parameters required for retrieving the frames, and configuring system services for post-processing and display.

At step 230, the plurality of frames for each thumbnail is retrieved from the corresponding buffer. The method for retrieving the plurality of frames for each thumbnail is explained in detail in conjunction with FIG. 5.

At step 235, the plurality of frames for each thumbnail are displayed, for example, simultaneously.

At step 240, a check is performed to determine if there are one or more additional thumbnails for subsequent display. The check is performed by comparing the total number of thumbnails to be displayed and the number of thumbnails to be displayed simultaneously. In various exemplary embodiments, the total number of thumbnails to be displayed is a superset of the number of thumbnails to be displayed simultaneously. The thumbnails which are present in the total number of thumbnails to be displayed (but not present in the number of thumbnails to be displayed simultaneously) can be referred to as remaining thumbnails. Thereafter, the one or more additional thumbnails for subsequent display are identified from the remaining thumbnails. The additional thumbnails can be identified based on a user action. For example, the user action can include browsing or navigating through the thumbnails in forward or backward direction.

Referring now to FIG. 2b, if it is determined, at step 240, that there are one or more additional thumbnails for subsequent display then all the additional thumbnails for subsequent display are included in number of thumbnails to be displayed simultaneously in the subsequent display and the method moves to step 215. The plurality of frames for the additional thumbnails can then be extracted and stored in buffers. The buffers can be spare buffers or buffers used by the frames of the thumbnails which were being displayed on the screen in the past. This helps in meeting the scenarios where limited resources in terms of memory are available.

If, at step 240, it is determined that there are no additional thumbnails for subsequent display then, at step 245, a check is performed to find if any input is received to play a video associated with any thumbnail. If any input is received for playing the video then the video associated with the thumbnail is played. The video can be a video file of multiple video files or a chapter out of several chapters of a single video file.

If no input is received, at step 245, to play a video associated with any thumbnail then the method moves to step 230 in FIG. 2a. The video associated with the thumbnail is played t step 255 if the input is received at step 245.

The method stops at step 255.

Figure 3:
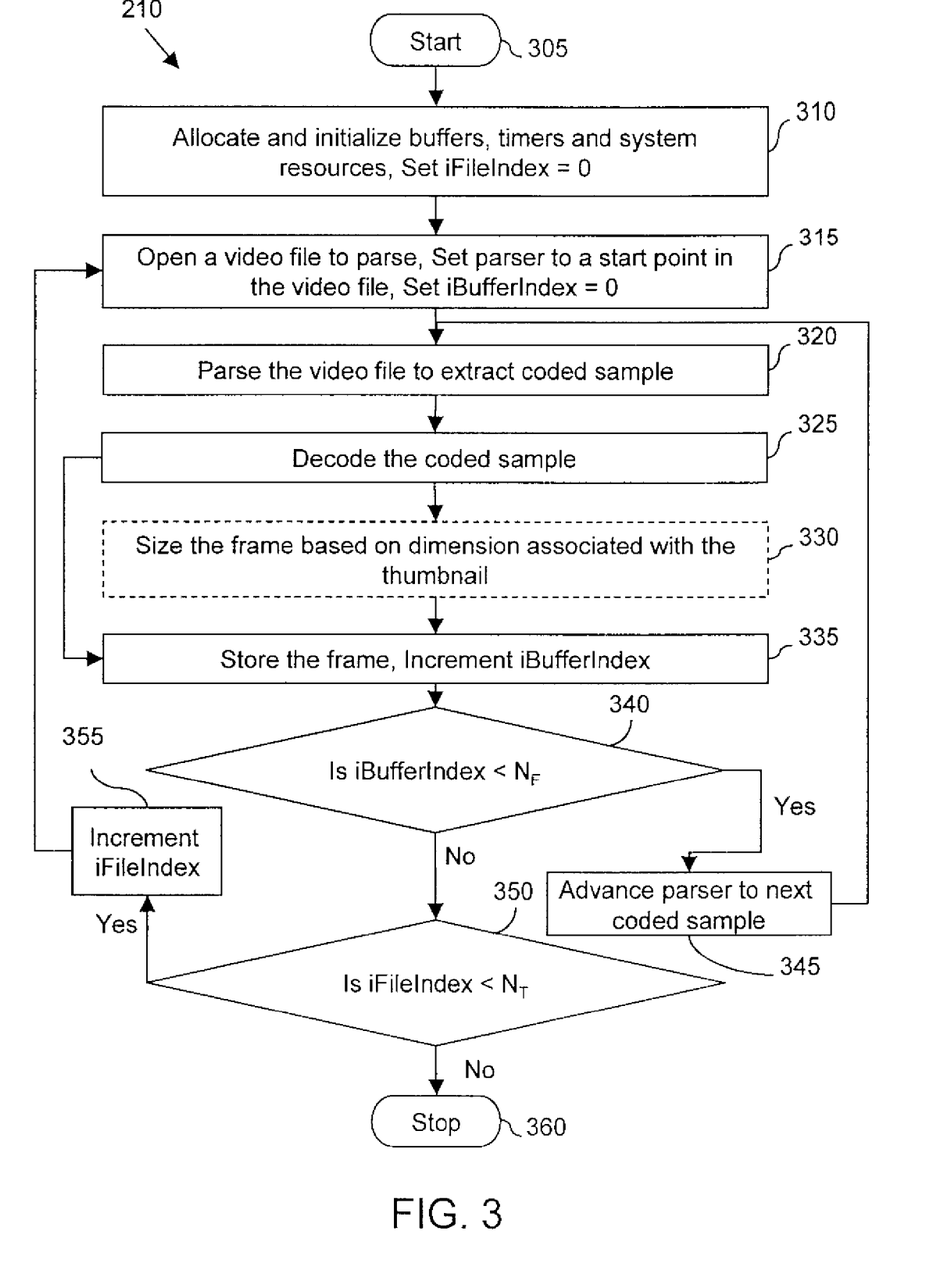
FIG. 3 is a flowchart illustrating a method for extracting a plurality of frames for each thumbnail from multiple video files, in accordance with one exemplary embodiment.

FIG. 3 is a flowchart illustrating some exemplary steps for a method for extracting a plurality of frames for each thumbnail from multiple video files, in accordance with one embodiment.

Referring now to FIG. 3, the method starts at step 305. At step 310, buffers, timers and system resources are allocated and initialized. In some exemplary embodiments, a buffer is allocated corresponding to each thumbnail. The size of each buffer can be governed by color space. For example, RGB 565 color space which is 2 bytes per pixel or YCbCr 420 color space which is 1.5 bytes per pixel. Each buffer can be divided further into various sections. Each section of the buffer corresponds to a frame. The number of sections in the buffer can be, for example, equal to the number of frames to be extracted.

In some exemplary embodiments, each section of the buffer can be referred to as a buffer itself and set of such buffers, each buffer corresponding to a frame, can be referred to as a queue.

The parameters which are received include:
$N_T$=Number of thumbnails to be displayed simultaneously
$N_F$=Number of frames extracted per thumbnail
$N_V$=Total number of thumbnails to be displayed At step 315, a video file is opened and parsed. The parser is set at a start point in the video file. The plurality of frames are selected based on the start point which can be first frame of the video file, the second Intra Frame with respect to start of the video file, a user marked starting point through some kind of configuration setting, best frame search using any kind of intelligent algorithm specialized for the purpose or any other method to help the user make a choice. Another iterative loop counter index, iBufferIndex=0 is set. The iBufferIndex indicates the sections of the $N_F$ buffers into which the decoded data is written.

At step 320, the single video file is preferably parsed to fetch coded sample from the bit stream. The coded sample is subsequently fed to the decoder configured at step 325, which results in the decoded frame being output with dimensions of the original video file in a specific color space.

In some exemplary embodiments, at step 330, the decoded sample or the frame is then sized to the desired thumbnail dimension using various methods available in the domain of color space image processing. The frame could also be converted into an independent encoded format which may comprise, for example, still image types, and/or animated still image types or any other type, thereby allowing saving of further memory.

At step 335, the frame is then stored in the corresponding section of the buffer. The iBufferIndex is incremented.

At step 340, a check is performed to determine whether iBufferIndex is less than $N_F$. If iBufferIndex is less than $N_F$, then the parser is advanced to next coded sample or next frame at step 345 and the method moves to step 320. If iBufferIndex is not less than $N_F$ then a check is performed at step 350 to find whether iFileIndex is less than $N_T$. If iFileIndex is less than $N_T$ then iFileIndex is incremented at step 355 and the method moves to step 315 to parse next video file. If iFileIndex is not less than $N_T$ then the method stops at step 360.

Upon completion of extraction of frames from one thumbnail, the iFileIndex is incremented and the step 315 to step 350 are repeated till iFileIndex reaches the boundary condition of $N_T$.

Upon completion of extraction of $N_T$ with $N_F$ frames, the thumbnails can be enabled for display.

In some exemplary embodiments, the process of extraction can take some amount of time for all $N_F$ frames. In such cases, the plurality of frames for extraction can be adjusted. The adjusted frames are a subset of the $N_F$ frames. An additional input parameter $N_{FL}$=Number of Fast Load Frames, indicating the number of frames that would be displayed initially to the user can be received. $N_F$ can then be replaced by $N_{FL}$ in the steps mentioned above. The display can then be enabled once the $N_{FL}$ frames are extracted for each thumbnail.

In some exemplary embodiments, a subset of the plurality of frames can be saved to increase the duration of repetition of the animation per thumbnail. The subset can include alternate frames. Thus, decoding $2 \times N_F$ frames in total, but saving only $N_F$ frames out off them.

In some exemplary embodiments, at the end of extraction of the frames for a thumbnail, the parser and the decoder are re-initialized to open a next video file present within the video file list. This is done in cases where a single parser decoder instance is used.

Figure 4:
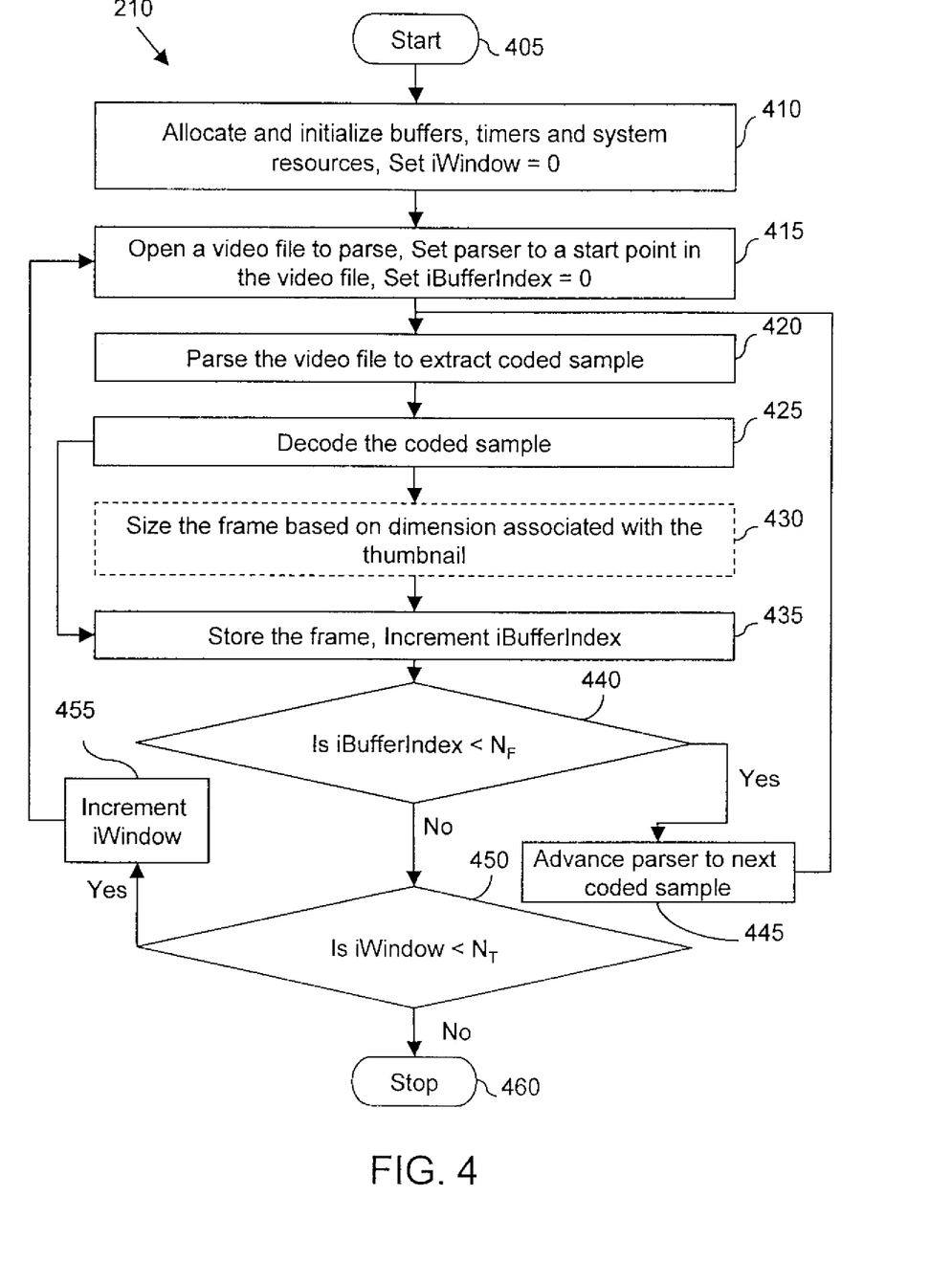
FIG. 4 is a flowchart illustrating a method for extracting a plurality of frames for each thumbnail from a single video file, in accordance with one exemplary embodiment.

FIG. 4 is a flowchart illustrating exemplary steps of a method for extracting a plurality of frames for each thumbnail from a single video file, in accordance with one exemplary embodiment of the present invention.

Now referring to FIG. 4, the method starts at step 405. At step 410, buffers, timers and system resources can be allocated and initialized. In some exemplary embodiments, a buffer is allocated corresponding to each thumbnail. The size of each buffer can be governed by color space. For example, RGB 565 color space which is 2 bytes per pixel or YCbCr 420 color space which is 1.5 bytes per pixel. Each buffer can be divided further into various sections. Each section of the buffer corresponds to a frame. The number of sections in the buffer is equal to the number of frames to be extracted.

The parameters which are received include:
$N_T$=Number of thumbnails to be displayed simultaneously
$N_F$=Number of frames extracted per thumbnail
$N_V$=Total number of chapters to be displayed
$T_D$=Duration of the video file
$T_{si}$=Start time of thumbnail i, where i=0 to $N_V$
$T_{ei}$=End time of thumbnail i, where i=0 to $N_V$ Each thumbnail corresponds to a chapter. The chapters are of the single video file. The iWindow is a loop counter which is set as 0.

At step 415, the single video file is opened for parsing. The parser is positioned at the start point of the chapter $T_{Si}$. The plurality of frames is selected based on $T_{si}$. Another iterative loop counter index, iBufferIndex 0 is set. The iBufferIndex indicates the sections of the $N_F$ buffers into which the decoded data is written.

At step 420, the single video file is parsed to fetch coded sample from the bit stream. The coded sample is subsequently fed to the decoder configured at step 425, which results in the decoded frame being output with dimensions of the original video file in a specific color space.

In some exemplary embodiments, at step 430, the decoded sample or the frame is then resized to the desired thumbnail dimension using various methods available in the domain of color space image processing. The frame could also be converted into an independent encoded format which could be of still image types or animated still image types or any other type, thereby allowing saving of further memory.

At step 435, the frame is then stored in the corresponding section of the buffer. The iBufferIndex is incremented.

At step 440, a check is performed to find if iBufferIndex is less than $N_F$. If iBufferIndex is less than $N_F$ then the parser is advanced to next coded sample or next frame at step 445 and the method moves to step 420. If iBufferIndex is not less than $N_F$ then a check is performed at step 450 to find whether iWindow is less than $N_T$. If iWindow is less than $N_T$ then iWindow is incremented at step 455 and the method moves to step 415. If iWindow is not less than $N_T$ then the method stops at step 460.

Upon completion of extraction of frames from one thumbnail, the iWindow is incremented and the step 415 to step 450 are repeated till iWindow reaches the boundary condition of $N_T$.

Upon completion of extraction of $N_T$ with $N_F$ frames, the thumbnails can be enabled for display.

In some exemplary embodiments, the process of extraction can take some amount of time for all $N_F$ frames. In such case the plurality of frames for extraction can be adjusted. The adjusted frames are a subset of the $N_F$ frames. An additional input parameter $N_{FL}$=Number of Fast Load Frames, indicating the number of frames that would be displayed initially to the user can be received. $N_F$ can then be replaced by $N_{FL}$ in the steps mentioned above. The display can then be enabled once the $N_{FL}$ frames are extracted for each thumbnail.

In some exemplary embodiments, a subset of the plurality of frames can be saved to increase the duration of repetition of the animation per thumbnail. The subset can include alternate frames. Thus, decoding $2 \times N_F$ frames in total, but saving only $N_F$ frames out off them.

Figure 5:
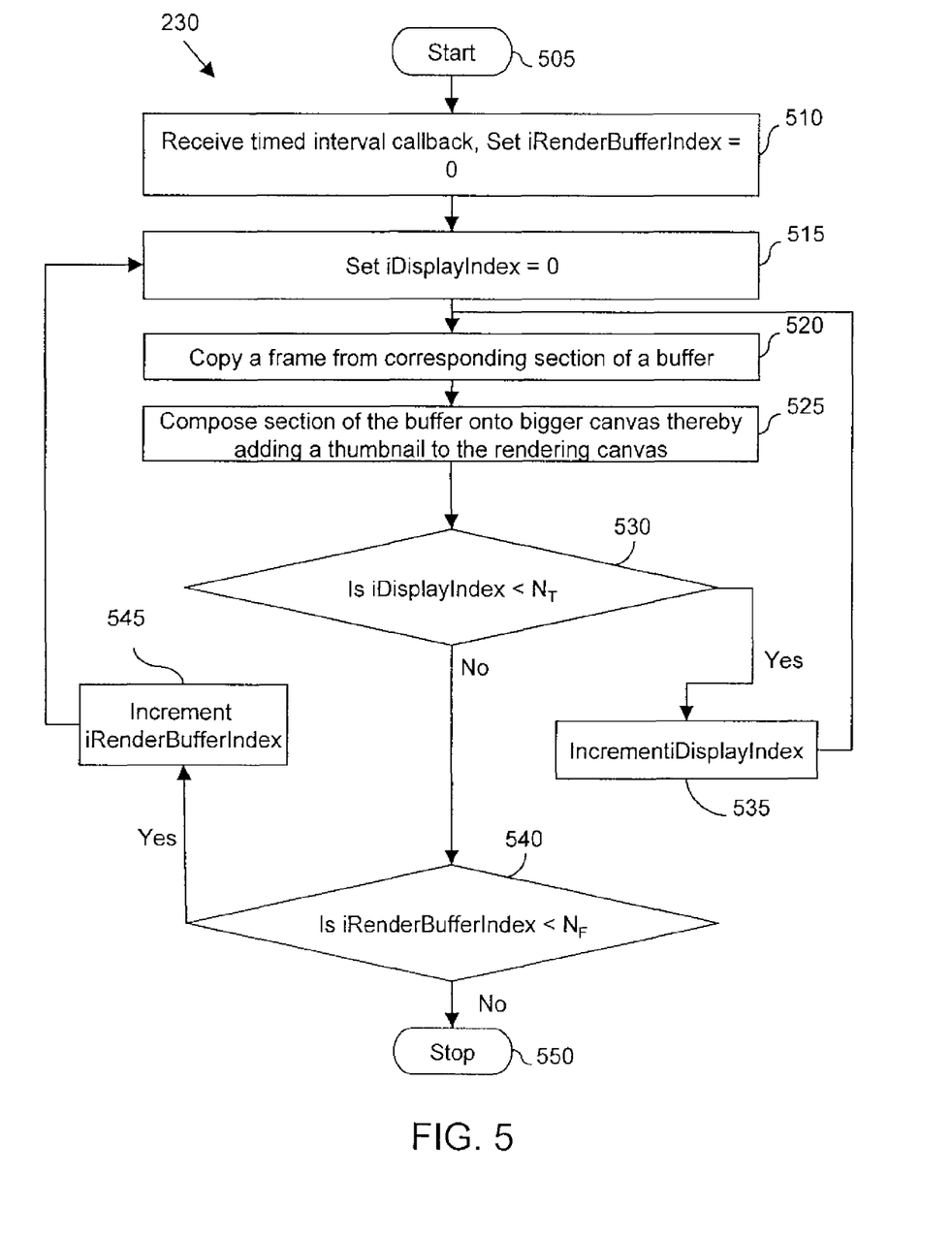
FIG. 5 is a flowchart illustrating a method for retrieving a plurality of frames for each thumbnail, in accordance with one exemplary embodiment.

FIG. 5 is a flowchart illustrating exemplary steps of a method for retrieving a plurality of frames for each thumbnail, in accordance with one exemplary embodiment of the present invention.

Now referring to FIG. 5, the method starts at 505. One or more steps of the method can be performed periodically.

At step 510, a timed interval callback is received and a loop counter iRenderBufferIndex is set to 0. The iRenderBufferIndex helps to decide the frames out of $N_F$.

At step 515, iDisplayIndex is set to 0.

At step 520, a section of a buffer corresponding to a frame of a thumbnail is copied to a single section canvas of desired color space.

At step 525, the section of the buffer is composed onto a bigger canvas thereby adding the thumbnail to the rendering canvas.

At step 530, a check is performed to determine if iDisplayIndex is less than $N_T$. If iDisplayIndex is less than $N_T$ then, at step 535, iDisplayIndex is incremented and the method moves to step 520. If iDisplayIndex is not less than $N_T$ then, at step 540, a check is performed to determine if iRenderBufferIndex is less than $N_F$. If iRenderBufferIndex is less than $N_F$ then iRenderBufferIndex is incremented, at step 545, and the method moves to step 515, else, the method stops at 550.

On reaching $N_F$, the counter can be re-initialized to 0, and the same sequence can be repeated.

Figure 6A:
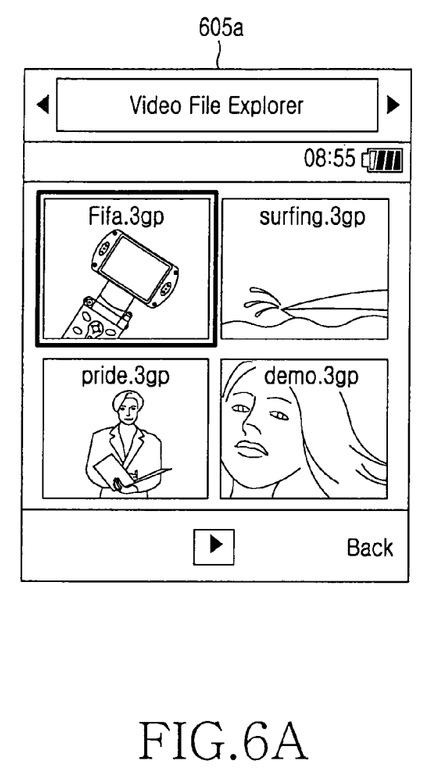
FIGS. 6a and 6b are exemplary representations of thumbnails generated for one or more video files, in accordance with one exemplary embodiment.

In some exemplary embodiments, to achieve an animated display of the stored frames, thereby giving preview playback effect, the frames are cyclically picked up from each buffer and composed onto a single buffer to be displayed using the display services of the device. In another exemplary aspect, each frame can be independently sent to the display service for display at designated location on the screen FIGS. 6a and 6b are exemplary representations of thumbnails generated for one or more video files, in accordance with one exemplary embodiment of the present invention FIG. 6a is an exemplary representation of a thumbnail 605a generated for multiple video files.

Figure 6B:
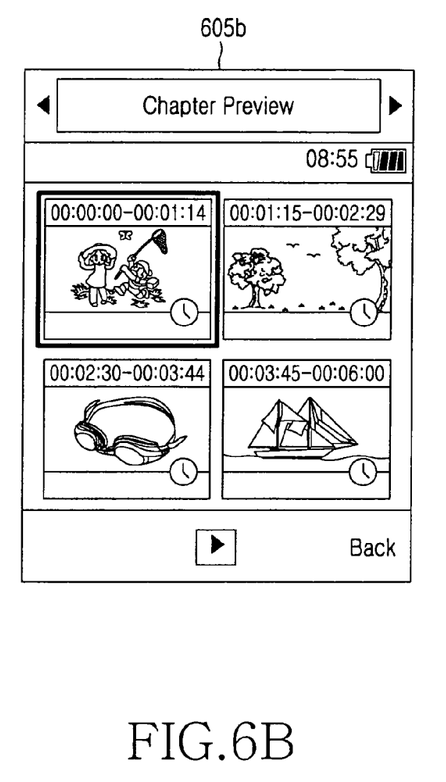

FIG. 6b is an exemplary representation of a thumbnail 605b generated for a single video file.

The method described above is explained in detail in conjunction with following example.

A mobile device includes seven video files in a file system. In the illustrated example, the mobile memory can have a maximum of six buffers, B0 to B5. One buffer corresponds to one thumbnail. The parameters received are as follows:

$N_T=4$
$N_V=7$
$N_F=30$

Each buffer has, in this particular, example 30 sections, S0 to S29. Initially, four video files, V1, V2, V3 ad V4 are considered. The frames are extracted for V1 first, followed by V2, V3 and V4. In one exemplary embodiment $N_{FL}=7$ is defined. Hence, seven frames are extracted for V1 and stored in a S0 to S6 of B0. In the illustrated example, a single parser decoder instance is used. Next, the parser decoder instance is reinitialized and seven frames are extracted for V2 and stored in S0 to S6 of B1 and so on for V3 and V4. The display of V1, V2, V3 and V4 is then enabled. The frames of the thumbnails of V1 to V4 are then displayed. For retrieving purposes, S0 of B0 to B3 is read and displayed. Next S1 of B0 to B3 is read and displayed. Meanwhile, in background the extraction continues and other section of buffers gets filled. For example, S7, S8 and so on. While displaying the frames, the reading is performed in to make sure that maximum number of frames is read. Hence, frames S7 and S8 are also included. Alternatively, logic could be built that reading is performed only after S0 to S29 is loaded.

In one illustrated example, when the user navigates from V1 to V4 then in background the extraction of V5 also starts. Hence, the frames from V5 is already decoded and saved so as to enable the user a quick preview when he wishes to move to V5. When all six buffers are occupied then the least used buffer can be replaced with frames of additional video that needs to be displayed.

In the preceding specification, the present disclosure and its advantages have been described with reference to specific exemplary embodiments. However, it will be apparent to a person of ordinary skill in the art that various modifications and changes can be made, without departing from the scope of the present disclosure, as set forth in the claims below. Accordingly, the specification and figures are to be regarded as illustrative explanatory examples of the present disclosure, rather than restrictive examples. All such possible modifications are within the scope of presently claimed invention.

I claim:

1. A method for generating thumbnails for video files, the method comprising:
   receiving one or more parameters associated with a plurality of thumbnails to be displayed simultaneously and a plurality of frames for each thumbnail;
   extracting a plurality of frames for each thumbnail from one or more video files;
   storing the plurality of frames for each thumbnail in a corresponding buffer;
   enabling display of the plurality of frames for each thumbnail;
   retrieving the plurality of frames for each thumbnail from the corresponding buffer; and displaying the plurality of frames for each thumbnail simultaneously;
   determining one or more additional thumbnails for subsequent display;
   extracting the plurality of frames for each additional thumbnail for said subsequent display;
   storing the plurality of frames for each additional thumbnail for subsequent display in a memory;
   wherein the determining one or more additional thumbnails comprises:
   receiving a total number of thumbnails to be displayed;
   checking whether a total number of thumbnails to be displayed is greater than the number of thumbnails to be displayed simultaneously; and
   identifying the one or more additional thumbnails for subsequent display from remaining thumbnails based on a user action, wherein the remaining thumbnails comprise thumbnails present in the total number of thumbnails to be displayed but not in the thumbnails to be displayed simultaneously.

2. The method of claim 1, wherein the extracting comprises:
   initializing one or more parsers for the one or more video files.

3. The method of claim 2, wherein the extracting comprises:
   initializing one or more decoders for the one or more video files.

4. The method of claim 3, wherein the extracting further comprises:
   parsing a video file of the one or more video files for each thumbnail; and decoding the plurality of frames of the video file for each thumbnail.

5. The method of claim 4, wherein the extracting further comprises:
   sizing the plurality of frames for each thumbnail based on dimensions associated with each thumbnail.

6. The method of claim 5, wherein the extracting further comprises:
compressing the plurality of frames for each thumbnail.

7. The method of claim 1, wherein the extracting comprises:
selecting the plurality of frames for each thumbnail for extraction.

8. The method of claim 1, wherein the extracting comprises:
adjusting the number of frames for each thumbnail for extraction.

9. The method of claim 1, wherein the storing comprises:
storage of a subset of the plurality of frames in said corresponding buffer.

10. The method of claim 1 further comprising:
receiving an input to play a video associated with a thumbnail; and
playing the video associated with the thumbnail.

11. A device comprising:
one or more decoders for decoding one or more video files;
a processor for generating a plurality of thumbnails from the one or more video files by extracting a plurality of frames for each thumbnail using one or more parsers; and
a storage device in communication with the processor for storing the plurality of frames for each thumbnail, whereby the plurality of frames for each thumbnail can be accessed from the storage unit;
wherein said processor being configured for:
determining one or more additional thumbnails for subsequent display;
extracting the plurality of frames for each additional thumbnail for said subsequent display;
storing the plurality of frames for each additional thumbnail for subsequent display in a memory; and
wherein the processor determining one or more additional thumbnails comprises:
receiving a total number of thumbnails to be displayed;
checking whether a total number of thumbnails to be displayed is greater than the number of thumbnails to be displayed simultaneously; and
identifying the one or more additional thumbnails for subsequent display from remaining thumbnails based on a user action, wherein the remaining thumbnails comprise thumbnails present in the total number of thumbnails to be displayed but not in the thumbnails to be displayed simultaneously.

12. The device of claim 11, further comprising:
an input device in communication with the processor for providing inputs for generating the plurality of thumbnails; and
a display in communication with the processor for displaying the plurality of frames for each thumbnail.

* * * * *